United States Patent [19]

Yoshioka et al.

[11] Patent Number: 4,693,828

[45] Date of Patent: Sep. 15, 1987

[54] METHOD OF ION-EXCHANGING AND/OR ADSORPTION

[75] Inventors: Toshio Yoshioka, Otsu; Seiichi Yoshikawa, Koga; Masaharu Shimamura, Otsu, all of Japan

[73] Assignee: Toray Industries, Inc., Tokyo, Japan

[21] Appl. No.: 866,489

[22] PCT Filed: Sep. 10, 1084

[86] PCT No.: PCT/JP84/00431

§ 371 Date: May 7, 1986

§ 102(e) Date: May 7, 1986

[87] PCT Pub. No.: WO86/01744

PCT Pub. Date: Mar. 27, 1986

[51] Int. Cl.$^4$ .............................................. C02F 1/42
[52] U.S. Cl. ................................. 210/679; 210/681; 210/683; 210/685; 210/686; 210/900

[58] Field of Search ............... 210/638, 663, 266, 505, 210/679, 681, 683, 685, 686, 900, 688

[56] References Cited

U.S. PATENT DOCUMENTS 4,313,832 2/1982 Shimizu et al. .................... 210/505

Primary Examiner—Ivars Cintins
Attorney, Agent, or Firm—Austin R. Miller

[57] ABSTRACT

This invention relates to a method of ion-exchange and/or adsorption, and to a method of producing pure water. More specifically, this invention relates to a method of ion-exchanging and/or adsorbing an unnecessary product or a useful product in a liquid to be treated. Concretely, this invention relates to a method of ion-exchange and/or adsorption and to a method of producing superpure water by first treating the liquid with an ion-exchange resin, and then treating the liquid with an ion-exchange fiber.

18 Claims, No Drawings

METHOD OF ION-EXCHANGING AND/OR ADSORPTION

TECHNICAL FIELD

This invention relates to a method of ion-exchanging and/or adsorption, and to a method of producing pure water. More specifically, this invention relates to a method of ion-exchanging and/or adsorption in a liquid, thereby separating an unnecessary or a useful product in the treated liquid.

BACKGROUND ART

Ion-exchange resins are conventionally widely used for treating liquid for ion-exchanging and/or adsorption. However, since most of the ion-exchange groups are located in the inner portion of the resin rather than in the surface area thereof, this treatment has drawbacks in that the reaction rate is low and so the treatment is time-consuming, and it is also difficult to conduct ion-exchanging and/or adsorption with high efficiency. If the ion-exchange resins are powdered or finely grained, other drawbacks are brought about that their handling becomes troublesome and the liquid-flow resistance becomes very high. It was proposed recently to treat a liquid with an ion-exchange fiber having a large surface area, so as to attain high reaction rate and high freedom in the selection of the form of the ion-exchanger in use. However, this method has a lethal drawback in its low treatment capacity due to the voluminousness of the fiber.

The present inventors intensively researched to eliminate the above-mentioned drawbacks to complete the present invention.

DISCLOSURE OF THE INVENTION

This invention provides a method of ion-exchanging and/or adsorption in a liquid with an ion-exchanger to separate a useless or a useful product characterized in that the liquid is first treated with an ion-exchange resin, and thereafter the liquid is treated with an ion-exchange fiber.

This invention is based on the surprising discovery that by treating a liquid first with an ion-exchange resin and then with an ion-exchange fiber, the useless and/or the useful product to be separated is ion-exchanged or adsorbed with high sensitvity, and the treatment capacity is drastically increased. This invention thus provides a method of ion-exchanging and/or adsorption which is applicable in various fields and which is far superior to conventional methods. Another object of the present invention is to provide a method of producing a large amount of highly pure water from raw water in a short time by removing impurities in the raw water by conducting ion-exchange and/or adsorption.

The ion-exchange resins used in the present invention include known and/or commercially available ion-exchange resins of usually 100 to 1000 $\mu m$ diameter. More specifically, examples of the resins used in the present invention include gel-type and MR-type ion-exchange resins produced by introducing ion-exchange groups to a styrene-divinyl benzene copolymer with a high chemical-resistance and heat-resistance. The ion-exchange groups include cation-exchange groups such as sulfo group, phospho group and carboxyl group; anion-exchange groups such as primary, secondary, and tertiary amino groups and quaternary ammonium group; and chelate groups such as aminocarboxylic group, amidoxime group, aminophosphoryl group, polyamine group, pyridyl group, dithiocarbamyl group.

The ion-exchange fiber used in the present invention includes known ion-exchange fibers of usually 0.1 to 100 $\mu m$ diameter and preferably 1 to 100 $\mu m$ diameter. The examples of the fiber include insoluble synthetic organic ion-exchange fibers produced by introducing ion-exchange groups to a synthetic organic polymer (ion-exchange polymer) of, for example, polystyrene-based, polyphenol-based, polyvinyl alcohol-based, polyacrylic-based, polyethylene-based or polyamide-based. In view of the mechanical strength and the retainability of its form, it is preferred that the fiber comprise a reinforcing polymer in addition to the ion-exchange polymer. Preferably, the fiber is a composite fiber comprising a reinforcing polymer as its core(s) and an ion-exchange polymer as its sheath which surrounds the core. The content of the reinforcing polymer in the fiber is usually 10 to 90% by weight, but preferably 20 to 80% by weight since if the reinforcing polymer content is too low, the mechanical strength of the fiber is lowered while if the reinforcing polymer content is too high, the ion-exchange and/or adsorption capacity is lowered. Poly(monovinyl aromatic compounds), especially polystyrene-based compounds are preferred as the ion-exchange polymer since they have excellent chemical-resistant and heat-resistant properties, so the operation can be repeated many times. Poly-$\alpha$-olefins are preferred as the reinforcing polymer since they have excellent chemical-resistant properties.

The "water content degree" of the fiber used in the present invention is usually 0.5 to 10, but preferably 1 to 5 since if it is too low, it becomes difficult to conduct ion-exchange and/or adsorption with high efficiency, while it is too high, the liquid-flow resistance becomes high. The "water content degree" herein used is defined by the following equation:

$$(\text{Water Content Degree}) = \frac{W - W_o}{W_o}$$

wherein W is the weight of a Na type (Cl type) cation (anion)-exchange fiber which, after being immersed in distilled water, is dehydrated of its surface water by being subjected to hydroextraction with a domestic centrifugal hydroextractor for 5 minutes, and $W_o$ is the weight of the fiber after being completely dried.

The ion-exchange fiber used in the present invention includes cation-exchange fibers, anion-exchange fibers and chelate fibers each having the above-mentioned cation-exchange groups, anion-exchange groups or chelate groups, respectively. The fiber may be used in a conventional form such as short fiber, filament, felt, fabric, unwoven fabric, fiber bundle, strand and paper, as well as corresponding cut pieces. Among these, short fibers having a length of 0.1 to 3 mm, preferably 0.2 to 2 mm are preferred since they are easy to pack and different kinds of fibers can be readily mixed.

Although the method of the present invention may be conducted batchwise, it is preferred to conduct the method continuously using fixed beds such that the liquid to be treated is first passed through a layer of an ion-exchange resin, and then passed through a layer of an ion-exchange fiber, since the operation is easier and the efficiency of the ion-exchange and/or adsorption may be promoted. By the method of the present invention wherein the liquid is treated with usually at least one ion-exchange resin and thereafter is treated with the same kind of ion-exchange fiber, a useless or a useful product in a large amount of liquid can be ion-exchanged or adsorbed with high efficiency in a short time. In the method of the present invention, the ion-exchange capacity of the ion-exchange fiber to that of the ion-exchange resin is usually 0.01 to 50%. If this ratio is too low, highly efficient ion-exchange and/or adsorption in a short time becomes difficult while if it is too large, the treatment capacity per fixed bed is decreased, so that the preferable ratio is 0.05 to 30%, and more preferably 0.1 to 20%. The type of the ion-exchange resins to be used and the combination thereof (compositing and mixing) can be suitably selected depending on the type of the useless or the useful product to be separated.

The method of the present invention may be applied to those operations conventionally conducted using ion-exchange resins in various fields such as softening of water; desalting of water, non-aqueous solution (organic solvent) and sea water; production of pure water; treatment of water in the recycled water system and/or pure water system in nuclear power plant and/or thermoelectric power plant; removal of toxic metals such as copper, mercury and cadmium; isolation and recovery of useful heavy metals such as uranium and rare earth metals in the sea water; removal of chromic acid; decoloration and desalting of various sugar solutions; purification and separation of various pharmaceuticals and antibiotics such as streptomycin and penicillin; purification and separation of amino acids such as lysine and glutamic acid; separation of optical isomers and isomerized sugars such as glucose and fructose; adsorption of various organic acids and organic bases; adsorption of surface active agents; purification of iodine; purification of formalin; adsorption of pigments such as dyestuffs; and removal of moisture.

The method of the present invention is also applicable to the adsorption and/or removal of proteins, peptides, enzymes, nucleic acids, hormones, nucleotides, alkaloids, lipids, steroids, viruses, cells such as bacteria, iron oxides, iron hydroxides, organic and inorganic colloidal substances such as silica, acidic gases such as hydrogen halides and sulfurous acid gas, and basic gases such as ammonia and amines. The method of the present invention is further applicable to the purification of blood and blood plasma.

The method of the present invention may be advantageously applied for removing unnecessary products by ion-exchange and/or adsorption to purify the liquid treated. In particular, this invention is most advantageously applied to the production of pure water by treating a raw water with a cation-exchanger and an anion-exchanger.

A method of producing pure water will now be described in detail.

A cation-exchanger containing cation-exchange groups, preferably sulfo groups is used after being activated with an acid, and an anion-exchanger containing anion-exchange groups, preferably quaternary ammonium groups is used after being activated with an alkali. Ordinary industrial water, city water, well water, tap water, underground water, water passed through a reverse-osmosis (RO) membrane, and recycled water in nuclear power plants and thermoelectric power plants are advantageously used as the raw water. It is preferred that the method comprise the step of treating the raw water with an ion-exchange resin and then treating the water with the same kind of ion-exchange fiber.

The examples of the order of the treatment includes, but not limited to, $K_R \rightarrow K_F \rightarrow A_R$, $K_R \rightarrow A_R \rightarrow K_F$, $K_R \rightarrow K_F \rightarrow A_R \rightarrow A_F$, $K_R \rightarrow A_R \rightarrow K_F \rightarrow A_F$, $K_R \rightarrow A_R \rightarrow K_F A_F$, $K_R A_R \rightarrow K_F A_F$, and $K_R \rightarrow A_R \rightarrow K_R A_R \rightarrow K_F \rightarrow A_F$, wheerein $K_R$ and $A_R$ means a cation-exchange resin and an anion-exchange resin, respectively, $K_F$ and $A_F$ means a cation-exchange fiber and an anion exchange fiber, respectively, $K_R A_R$ means a mixture of cation-exchange resin and an anion-exchange resin, and $K_F A_F$ means a mixture of cation-exchange fiber and an anion-exchange fiber. Instead of the mixture of a cation-exchange fiber and an anion-exchange fiber, a mixture of a cation-exchange fiber and a powdered anion-exchange resin, or a mixture of an anion-exchange fiber and a powdered cation-exchange resin may be used.

To prepare highly pure water, it is preferred to treat the raw water with at least a mixture of a cation-exchange fiber and an anion-exchange fiber after treating the water with an ion-exchange resin, and the preferred order of treatment includes the above-mentioned $K_R \rightarrow A_R \rightarrow K_F A_F$, $K_R A_R \rightarrow K_F A_F$, and $K_R \rightarrow A_R \rightarrow K_R A_R \rightarrow K_F A_F$. The mixing ratio (in equivalence) of the cation-exchanger and the anion-exchanger, especially the cation-exchange fiber and the anion-exchange fiber is usually 10:1 to 1:10, preferably 5:1 to 1:5, and more preferably 3:1 to 1:3.

By applying the present invention to a known superpure water production system comprising Pretreatment→RO membrane→Ion-exchange→Sterilization with UV light→MF (membrane filter), UF (ultrafilter), or RO membrane, a superpure water which is superior to conventional pure water in its specific resistance, TOC (total organic compounds), the number of particles contained, and the number of live bacteria contained may be obtained.

As stated above, the present invention has the following advantages: Firstly, ion-exchange and/or adsorption can be conducted in a short time. Secondly, ion-exchange and/or adsorption can be conducted with high efficiency. Thirdly, the ion-exchange and/or adsorption capacity is large. Fourthly, a large amount of highly pure water can be produced in a short time.

Examples of the present invention will now be described. It should be noted that this invention is not limited thereto.

EXAMPLE 1

Forty milliliters (76 milli equivalence) of commercially available cation-exchange resin Amberlite IR-120B was packed in a column (1.7 cm diameter × 18 cm) and was activated with an acid (column $K_R$). Forty milliliters (13 milli equivalence) of cation-exchange fibers in the form of cut fibers of 1 mm length were packed in a column (1.7 cm diameter × 17 cm) and was activated with an acid (column $K_F$). Eighty milliliters (108 milli equivalence) of commercially available anion-exchange resin Diaion SA20AP was packed in a column (1.7 cm diameter × 36 cm) and was activated with an alkali (column $A_R$). Tap water was passed through, in the order mentioned, column $K_R \rightarrow$ column $K_F \rightarrow$ column $A_R$ at a rate of 3 liters/hr to obtain pure water. The specific resistance of the eluted water was measured to evaluate the performance of the system in removing cations. The relationship between the amount of the water flowed and the specific resistance is shown in Table 1.

COMPARATIVE EXAMPLE 1

The same procedure as in Example 1 was repeated except that the order of the column was column $K_R \rightarrow$ column $A_R$, and column $K_F \rightarrow$ column $A_R$, respectively, and the specific resistance of the eluted water was determined. The relationship between the amount of the water flowed and the specific resistance is shown in Table 1.

TABLE 1

| | TREATMENT | SPECIFIC RESISTANCE (MΩ·cm) AMOUNT FLOWED (liter) | | | | | | | | | | | | | | | | | | | | | | | | |
|---|---|---|---|---|---|---|---|---|---|---|---|---|---|---|---|---|---|---|---|---|---|---|---|---|---|---|
| | | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 71 | 75 | 78 |
| THE INVENTION | $K_R \rightarrow K_F \rightarrow A_R$ | | | | | | | | | | 7 | | | | | | | | | | | | | 5 | 3 | 1 | |
| COMPARATIVE EXAMPLES | $K_R \rightarrow A_R$ | 4 | | | | 5 | | 4 | 3 | 2 | 1 | | | | | | | | | <1 | | | | | | | |
| | $K_F \rightarrow A_R$ | | 6 | | | | | | | | | | | | <1 | | | | | | | | | | | | |

As shown in Table 1, according to the example of the present invention, the amount of treated water, at a flow rate of 3 liters/hr, in a run in which a water having a specific resistance of 1 MΩ.cm or more was obtained was 78 liters. On the other hand, according to the comparative examples, it was 42 liters and 9 liters, respectively, totalling only 51 liters. Thus, it can be seen that the treatment capacity of the method of the present invention is very large. Further, the specific resistance of the water obtained by the method of the present invention was very high. Thus, it can be seen that the cations in the water were ion-exchanged or adsorbed with high efficiency, and highly pure water can be produced in a large amount by the method of the present invention.

EXAMPLE 2

Thirty milliliters of commercially available mixed resin Amberlite MB-1 (29 milli equivalence of cations, 21 milli equivalence of anions) was packed in the lower portion of a column (1.7 cm diameter × 54 cm), and 90 ml of mixed resins Amberlite MB-2 (57 milli equivalence of cations, 81 milli equivalence of anions) was packed thereon (column $K_RA_R$). In a column (1.7 cm diameter × 54 cm), 120 ml of a mixture of cut fibers of 1 mm length (15 milli equivalence of cations, 10 milli equivalence of anions) was packed (column $K_FA_F$). Tap water was passed through, in the order mentioned, column $K_RA_R \rightarrow$ column $K_FA_F$ to prepare pure water. The relationship between the amount of water flowed and the specific resistance is shown in Table 2.

COMPARATIVE EXAMPLE 2

The same procedure as in Example 1 was repeated except that one of column $K_RA_R$ and column $K_FA_F$ was used in each run, and the specific resistance of the eluted water was determined. The relationship between the amount of the water flowed and the specific resistance is shown in Table 2.

As shown in Table 2, according to the example of the present invention, the amount of treated water, at a flow rate of 3 liters/hr, in a run in which a water having a specific resistance of 10 MΩ.cm or more was obtained was 47 liters. On the other hand, according to the comparative examples, it was 25 liters and 7 liters, respectively, totalling only 32 liters. Thus, it can be seen that the treatment capacity of the method of the present invention is very large. Further, the specific resistance of the water obtained by the method of the present invention was very high. Thus, it can be seen that the cations in the water was ion-exchanged or adsorbed with high efficiency, and highly pure water can be produced in a large amount by the method of the present invention.

TABLE 2

| | TREATMENT | SPECIFIC RESISTANCE (MΩ·cm) AMOUNT FLOWED (liter) | | | | | | | | | | | | | | | |
|---|---|---|---|---|---|---|---|---|---|---|---|---|---|---|---|---|
| | | 3 | 6 | 9 | 12 | 15 | 18 | 21 | 24 | 27 | 30 | 33 | 36 | 39 | 42 | 45 | 48 |
| THE INVENTION | $K_RA_R \rightarrow K_FA_F$ | | | | | | | | >18 | | | | | | | | 5 |
| COMPARATIVE EXAMPLES | $K_RA_R$ | | | | 14 | | | | | | 11 | 9 | 5 | 2 | 1 | <1 | |
| | $K_FA_F$ | | 18 | | | | | | | | | <1 | | | | | |

EXAMPLE 3

In the lower portion of a column (1.7 cm diameter × 54 cm), 30 ml of a mixture of cut fibers of 1 mm length (3.8 milli equivalence of cations, 2.5 milli equivalence of anions) was packed, and 90 ml of commercially available mixed resins Amberlite MB-2 (57 milli equivalence of cations, 81 milli equivalence of anions) was packed thereon (column $K_RA_R$ 90 ml→$K_FA_F$ 30 ml). Tap water was passed through the column from its top to the bottom at a flow rate of 3 liters/hr to produce pure water. The relationship between the amount of the water flowed and the specific resistance is shown in Table 3.

EXAMPLE 4

In the lower portion of a column (1.7 cm diameter × 54 cm), 10 ml of a mixture of cut fibers of 1 mm length (cation 1.3 milli equivalence, anion 0.85 milli equivalence) was packed, and 110 ml of commercially available mixed resin Amberlite MB-2 (cation 70 milli equivalence, anion 99 milli equivalence) was packed thereon (column $K_RA_R$ 110 ml→$K_FA_F$ 10 ml). Pure water was produced using this column in the same manner as in Example 3. The relationship between the amount of the water flowed and the specific resistance is shown in Table 3.

COMPARATIVE EXAMPLE 3

In a column (1.7 cm diameter × 54 cm), 120 ml of commercially available mixed resins Amberlite MB-2 (76 milli equivalence of cations, 108 milli equivalence of anions) was packed (column $K_RA_R$ 120 ml). Pure water was produced using this column in the same manner as in Example 3. The relationship between the amount of the water flowed and the specific resistance is shown in Table 3.

As shown in Table 3, according to the examples of the present invention, the amount of treated water, at a flow rate of 3 liters/hr, in a run in which a water having a specific resistance of 10 MΩ.cm or more was obtained was 35 liters and 43 liters, respectively. On the other hand, according to the comparative examples, it was 30 liters. Thus, it can be seen that the treatment capacity of the method of the present invention is very large. Further, the specific resistance of the water obtained by the method of the present invention was very high. Thus, it can be seen that the impurities in the water were ion-exchanged or adsorbed with high efficiency, and highly pure water can be produced in a large amount by the method of the present invention. Further, it can be seen that if the ion-exchange capacity of the fibers used is increased, the purity of the treated water is promoted but the treatment capacity is decreased, and conversely, if the ion-exchange capacity of the fibers used is decreased, the treatment capacity is increased but the purity of the treated water is decreased.

prepared and tap water was passed through this system at a flow rate of 10 liters/hr. After flowing 2300 liters of water, the quality of the water from the outlet was checked. The specific resistance was 18 (0.01) MΩ.cm or more, the number of live bacteria was 0.00 (0.63)/ml, pyrogen content was 0.003 (1.998) ng/ml, the total number of particles of not smaller than 0.2 μm was 4 ($1.5 \times 10^5$)/ml, TOC was 0.15 (1.2)ppm, sodium content was less than 0.001 (7.6)ppm, and the silica content was less than 0.005 (0.46)ppm. The values in the parentheses show the values obtained for tap water. It can be seen from these results that according to the present invention, a superpure water can be easily obtained, and its water quality is very high.

The cation- and anion-exchange fibers used in the above examples and comparative examples were produced by the following process:

Multi-core islands-in-a-sea type composite fibers (non-elongated fibers) (sea component (polystyrene/polypropylene)/islands component (polypropylene)=(47/4)/49 (the number of islands:16; diameter of the fibers:34 μm) were cut in pieces to obtain cut

TABLE 3

| TREATMENT | | SPECIFIC RESISTANCE (MΩ · cm) AMOUNT FLOWED (liter) | | | | | | | | | | | | | |
|---|---|---|---|---|---|---|---|---|---|---|---|---|---|---|---|
| | | 3 | 6 | 9 | 12 | 15 | 18 | 21 | 24 | 27 | 30 | 33 | 36 | 39 | 42 | 45 |
| THE INVENTION | $K_RA_R$ 90 ml → $K_FA_F$ 30 ml | | | | | >18 | | | | | | | 2 | | <1 | |
| COMPARATIVE EXAMPLES | $K_RA_R$ 110 ml → $K_FA_F$ 10 ml | | | | | | | 16 | | | | | | | | 2 |
| | $K_RA_R$ 120 ml | | | | | 14 | | | | 12 | 10 | 7 | 3 | 1 | <1 | |

EXAMPLE 5, COMPARATIVE EXAMPLE 4

Water flowed through RO membrane was passed through a column (7.0 cm diameter) containing 1 liters of commercially available mixture of resins Amberlite MB-2, and then through a column (7.0 cm diameter) containing 1.8 liters of mixed resins for superpure water production, Amberlite EG-290, at a flow rate of 30 liters/hr. The resulting water was divided into two portions. One of which was passed through a column (7.0 cm diameter) containing 1 liter of a mixture of cut fibers of 1 mm length (150 milli equivalence of cations, 10 milli equivalence of anions), while the other portion of the water was passed through a column (7.0 cm diameter) containing 1 liter of mixed resins for superpure water production, Amberlite EG-290. In both cases, the flow rate was 15 liters/hr. The quality of the water from the outlet was checked. According to the example of the present invention (the former), after flowing 2400 liters of water, the specific resistance was 18 MΩ.cm or more, the total number of particles of 0.2 μm diameter or more was 6/ml. On the other hand, according to the comparative example (the latter), after flowing 2400 liters of water, the specific resistance was 17.5 MΩ.cm, the total number of particles of 0.2 μm diameter or more was 24/ml. From these results, it can be seen that a water can be obtained by the method of the present invention, which is much superior to that obtained in the comparative example especially in terms of the total number of particles contained in water.

EXAMPLE 6

A system comprising, in the order mentioned, a filter of 10 μm pore size, a column (7.0 cm diameter) containing 1 liter of Amberlite MB-2, a column (3 cm diameter) containing 0.2 liter of a mixture of cut fibers of 1 mm length (30 milli equivalence of cations, 20 milli equivalence of anions), and a filter of 0.22 μm pore size was fibers of 1 mm length. One part by weight of the cut fibers were added to a cross-linking/sulfonating solution consisting of 7.5 parts by volume of commercially available sulfuric acid of first class grade and 0.15 parts by weight of paraformaldehyde. The mixture was heated at 80° C. for 4 hours and the fibers were washed with water. The fibers were then treated with an alkali followed by washing with water to obtain cation-exchange fibers containing sulfo groups (ion-exchange capacity: 2.8 milli equivalence/g-Na; water content degree:1.5).

On the other hand, 1 part by weight of the above cut fibers were added to a cross-linking solution consisting of 5 parts by volume of commercially available sulfuric acid of first class grade, 0.5 parts by volume of water and 0.2 parts by weight of paraformaldehyde, and the mixture was heated at 80° C. for 4 hours. The thus cross-linked fibers were then added to a solution consisting of 8.5 parts by volume of chloromethyl ether and 1.5 parts by volume of stannic chloride, and this mixture was allowed to react for 1 hour at 30° C. After the reaction, the fibers were washed with 10% hydrochloric acid, distilled water, and acetone. The thus chloromethylated fibers were then added to 10 parts by volume of 30% aqueous solution of trimethylamine, and this mixture was allowed to react for 1 hour at 30° C. to aminate the fibers. After washing the fibers with water, the fibers were treated with hydrochloric acid, and washed with water to obtain anion-exchange fibers containing trimethylammonium methyl groups (ion-exchange capacity of 2.4 milli equivalence/g-Cl; water content degree of 1.8).

The mixture of the fibers were obtained by mixing the cation-exchange fibers and anion-exchange fibers at a prescribed ratio after activating the cation- and anion-exchange fibers with an acid or an alkali, respectively.

We claim:

1. A method of producing superpure water with an ion-exchanger, characterized in that the water is treated with a resin component containing an ion exchange resin selected from the group consisting of cation- and anion-exchange resins and mixtures thereof having an average particle diameter of 100 to 1000μ, and thereafter the water is treated with an ion-exchange fiber component containing an ion-exchange fiber selected from the group consisting of a cation-exchange fiber, an anion-exchange fiber and a chelate fiber and mixtures thereof.

2. A method of producing superpure water as defined in claim 1, wherein said ion-exchange fiber is a composite fiber comprising a reinforcing polymer core and an ion-exchange polymer sheath which surrounds the core.

3. A method of producing superpure water as defined in claim 2, wherein said ion-exchange polymer is a poly(monovinylaromatic) compound.

4. A method of producing superpure water as defined in claim 2, wherein said reinforcing polymer is a poly-α-olefin.

5. A method of producing superpure water as defined in claim 1, wherein the water content degree of said ion-exchange fiber is within the range of from 0.5 to 10.

6. A method of producing superpure water as defined in claim 1, wherein the water content degree of said ion-exchange fiber is within the range of from 1 to 5.

7. A method of producing superpure water as defined in claim 1, wherein said ion-exchange fiber component comprises short fibers having a diameter of 1 to 100 μm and a length of 0.2 to 2 mm.

8. A method of producing superpure water as defined in claim 1, wherein said method is conducted using fixed beds.

9. A method of producing superpure water as defined in claim 1, wherein the ion-exchange capacity of said ion-exchange fiber relative to that of said ion-exchange resin is within the range of from 0.05 to 30%.

10. A method of producing superpure water as defined in claim 1, wherein the ion-exchange capacity of said ion-exchange fiber relative to that of said ion-exchange resin is within the range of from 0.1 to 20%.

11. A method of producing superpure water as defined in claim 1, wherein said cation-exchange resin contains a sulfonic group and said anion-exchange resin contains a quaternary ammonium group.

12. A method of producing superpure water as defined in claim 1, wherein said cation- and anion-exchange resins are mixed.

13. A method of producing superpure water as defined in claim 1, wherein said ion-exchange fiber component is a mixture and contains a cation-exchange fiber having a sulfonic group and an anion-exchange fiber having a quaternary ammonium group.

14. A method of producing superpure water as defined in claim 1, wherein said ion exchange fiber component is a mixture and contains a cation-exchange fiber having a sulfonic group and a powdered anion-exchange resin having a quaternary ammonium group.

15. A method of producing superpure water as defined in claim 1, wherein said ion exchange fiber component is a mixture and contains a powdered cation-exchange resin having a sulfonic group and an anion-exchange fiber having a quaternary ammonium group.

16. A method of producing superpure water as defined in claim 1, wherein said ion-exchange fiber component comprises a cation-exchange fiber which contains a sulfonic group and an anion-exchange fiber which contains a quarternary ammonium group.

17. A method of producing superpure water as defined in claim 1, wherein said ion-exchange fiber comprises a cation-exchange fiber present as a mixture.

18. A method of producing superpure water as defined in claim 1, wherein said chelate fiber comprises chelate groups selected from the group consisting of aminocarboxylic group, amidoxime group, aminophosphoryl group, polyamine group, pyridyl group and dithiocarbamyl group.

* * * * *